United States Patent Office 3,247,043
Patented Apr. 19, 1966

3,247,043
ADHESION OF A REINFORCING ELEMENT TO A RUBBERY COMPOSITION
James A. Cardina, Akron, Ohio, assignor to The Goodyear Tire & Rubber Company, Akron, Ohio, a corporation of Ohio
No Drawing. Filed Jan. 27, 1961, Ser. No. 85,176
6 Claims. (Cl. 156—314)

This invention relates to a method of improving the adhesion of a reinforcing element, particularly polyester fiber, to a rubbery composition and to composite articles thereof.

In the manufacture of rubber goods, including pneumatic tires, transmission belts, and mechanical rubber goods made of rubber requiring cord reinforcement, the life of the goods depends in large part upon the strength of the adhesive bond developed between the cord and the rubber being reinforced thereby.

With the advent of polyester fibers and their exceptional tensile strength, use was found for these fibers in the reinforcement of rubber goods, including pneumatic tires, conveyor belts and the like. Because of the nature of the polyester fiber, satisfactory adhesion between the fiber and the rubber was difficult to achieve. If a suitable adhesive system could be developed for bonding the polyester fiber to rubber, then improved articles made of rubber reinforced thereby could be realized.

Attempts have been made to improve the bonding of polyester cord to rubber by treating the surface of the cord with a polyepoxide and an epoxy curing agent, followed by heat treatment. This treatment is not economical nor as effective as desired. The epoxy curing agent which is generally an amine is toxic and also may degrade the polyester cord. Also, it is more expensive to add a separate epoxy curing agent to the first treatment administered to the cord. Furthermore, high bond strength is not developed when the cord is subsequently treated with a conventional adhesive and imbedded in rubber and vulcanized.

The prior art then attempted to solve these problems by omitting the epoxy curing agent from the first treatment of the cord with an epoxy resin and heat, and substituted a rubber latex in the first treatment, followed by a second treatment using the epoxy curing agent together with a rubber latex. But this process introduced the problem of tackiness. The tacky cord tended to foul the equipment used to dry the cord. Furthermore, the cord could not be rolled up on itself after this first treatment with epoxy resin and latex and shipped to a remote point for application of the second treatment with a conventional adhesive because the cord tended to stick to itself and thus interfered with removal of the cord from the roll. It was also observed that exceptionally high temperatures were necessary in order to develop satisfactory cord-to-rubber adhesions.

It has now been discovered that these problems flowing from the previous attempts to solve this cord-to-rubber bonding problem are overcome by the present invention wherein polyester fibers twisted, for example, into a cord are first treated, either in the fiber condition or after being twisted into a cord, with a solution consisting of a polyepoxide and then heated at a temperature sufficient to remove as by vaporization, decomposition or burning, as the case may be, at least a portion of the polyepoxide, which temperature is generally above about 290° F. to below the softening temperature of the polyester fiber. The heat treatment may continue for about 1 to about 5 minutes. The epoxy-treated and heat-treated polyester cord is dipped in a conventional adhesive composition comprising essentially a polyhydric phenol, an aldehyde and a rubber latex. This second composition is heated at temperatures similar to those used in the heat treatment of the epoxy resin applied in the first treatment. The advantages of this process over those previously discussed are many, the most important being the extremely high cord-to-rubber adhesion obtained at moderate heating conditions, generally in the range of 300 to 350° F. for about 3 minutes. No problem exists with respect to stiffness nor tackiness of the cord after the first treatment. Important also is the fact that the present process is more economical to use because of the elimination of an expensive curing agent for the epoxy resin, more facile and efficient because of the ease with which the epoxy-treated cord can be run through conventional drying and dipping equipment. Of considerable importance is the fact that the first treatment step of the present inventive process may be applied by the fiber manufacturer at the time the fiber is being made, thus providing a fiber, that may be used by, for example, the tire manufacturer, that needs only be treated with a conventional adhesive of the nature described above. A still further advantage to be gained from the process of the present invention is in the advantage of using dilute solutions of the epoxy resin used in the first treatment of the cord without loss of adhesion which is observed when the epoxy resin is used in the manner described for the prior art above. Desirable adhesions are obtained when using as little as ½% epoxy solids in the first treatment.

The adhesive compositions that may be used in combination with an epoxy resin-treated polyester fiber are those adhesive compositions comprising an aqueous dispersion of a rubbery hydrocarbon polymer and a phenol/aldehyde heat convertible resole. The rubber polymer may be any diene type of rubbery polymer as, for example, copolymers resulting from the polymerization of a conjugated diene and vinylpyridine, or a vinyl aromatic monomer, such as styrene.

The phenol/aldehyde heat convertible resole is the condensation product of an aldehyde with a phenol which under the influence of heat becomes permanently infusible. Examples of phenols include halogen or alkyl substituted phenols such as chlorophenols, tertiary butyl phenol and tertiary amyl phenol and polyhydric phenols, including resorcinol, catechol, phloroglucinol, orcinol and hydroquinone. Formaldehyde is the preferred aldehyde for forming the resoles. Other aldehydes and aldehyde-producing agents that may be used include paraformaldehyde, hexamethylenetetramine, acetaldehyde, butyraldehyde, chloral, furfural and salicylaldehyde. The phenol/aldehyde resin is preferably used in combination with a synthetic or natural rubber latex; the rubber-to-resin ratio may range from 6:1 to 2:1 parts by weight.

An example of an adhesive composition referred to hereinafter as an R/F/L dip, and useful in this invention, is shown by the following formula:

EXAMPLE A

| | Parts (by weight) |
|---|---|
| SBR latex (40% solids) 75/25 butadiene/styrene rubbery copolymer | 100 |
| Resorcinol | 10.93 |
| Formaldehyde (37%) | 5.23 |
| Sodium hydroxide (10%) | 1.35 |
| Sodium dimethyl dithiocarbamate (41%) | 3.52 |
| Water sufficient to make 20% solids. | |

The adhesive was made by adding the resorcinol to the water and then the formaldehyde was added to the water, followed by the addition of sodium hydroxide and then the rubber latex. It is preferred to use sodium hydroxide as the alkali to catalyze the reaction of the phenol with the aldehyde to bring about the formation of the water-soluble and thermal-settable resin. The sodium hydroxide is used in an amount sufficient to furnish a pH in the finished adhesive dip of between 9.0 to 9.5. The aldehyde is preferred to be used in a molar excess ranging from 1.01 to 2.0 mols per mol of phenol and preferably from 1.5 to 1.7 mols of formaldehyde to 1 mol of resorcinol. The resulting reaction mixture may be aged from 1 to 24 hours after which the sodium dimethyl dithiocarbamate is added. The adhesive may also be aged for 4 hours or more after the carbamate has been added. The resulting 20% solids adhesive dip has a pH of about 9.2 and may then be applied to the reinforcing element which has been treated with polyepoxide and then heat-treated by passing the reinforcing element into the adhesive dip under tension and at a rate which will permit the cord to be wetted, and then into an oven where it is dried for a period of from about 1 minute to about 5 minutes at a temperature from about 200° F. to about 500° F. and more preferably at between about 300° F. and about 350° F. for about 3 minutes.

The linear polyesters used in preparing the synthetic fibrous materials used in the reinforcement of articles made of rubber are those high molecular weight linear products which may be cold drawn into a pliable, strong and elastic fiber having a high degree of orientation along the fiber axis. These polyesters are obtained by reacting glycols such as ethylene glycol, propylene glycol and the like, with dicarboxylic acids such as, for example, terephthalic acid, isophthalic acid, stilbenedicarboxylic acid and the like. Specific polyesters that may be bonded to rubber in accordance with the process of this invention, include Vycron, which may be produced in accordance with the disclosure set forth in U.S. Patent 2,965,613, and Dacron, which may be produced in accordance with the disclosure set forth in U.S. Patent 2,465,319.

Other materials difficult to bond to a rubbery composition are synthetic linear fiber-forming polyamides, particularly of the general type described in U.S. Patent 2,071,250; 2,071,253 and 2,130,948, and a particularly difficult type of nylon to bond to a rubber is the aromatic polyamides and specifically the copolymer of metaphenyl-enediamine and isophthalic acid. However, the adhesion of these polyamides to a rubber is greatly increased when treated in accordance with the process of this invention.

The epoxy composition used in the first treatment of the synthetic reinforcing elements comprises an aqueous medium containing a polyepoxide having one or more epoxy groups. The epoxy group may be present in an amount greater than 0.20 equivalent per 100 grams of epoxy material as determined by standard analysis and preferably has a molecular weight below about 900 and may be saturated or unsaturated and aliphatic, cycloaliphatic and aromatic, and may be substituted with such radicals as chlorine, hydroxy, alkoxy, and the like. Examples of epoxy resins that may be used in the first dip include the polyepoxy polyethers obtained by reacting, preferably in the presence of an acid-acting compound, such as hydrofluoric acid, one of the aforedescribed halogen-containing epoxides with a polyhydric alcohol, and subsequently treating the resulting product with an alkaline component. As used herein and in the claims, the expression "polyhydric alcohol" is meant to include those compounds having at least two free OH groups and includes the polyhydric alcohols and their ethers and esters, hydroxy-aldehydes, hydroxy-ketones, halogenated polyhydric alcohols, polyhydric phenols such as resorcinol and hydroquinone, and the like. Polyhydric alcohols that may be used for this purpose may be exemplified by glycerol, propylene glycol, ethylene glycol, diethylene glycol, butylene glycol, hexane-triol, sorbitol, mannitol, pentaerythritol, polyallyl alcohol, polyvinyl alcohol, inositol, trimethylolpropane, bis(4-hydroxycyclohexyl) dimethylmethane, 1,4-dimethylolbenzene, 4,4'-dimethyloldiphenyl, dimethyloltoluenes, and the like. The polyhydric ether alcohols include, among others, diglycerol, triglycerol, dipentaerythritol, tripentanerythritol, dimethylolanisoles, beta-hydroxyethyl ethers of polyhydric alcohols, such as diethylene glycol, polyethylene glycols, bis(beta-hydroxyethyl ether) of hydroquinone, bis(beta-hydroxyethyl ether) of bis-phenol, beta-hydroxyethyl ethers of glycerol, pentaerythritol, sorbitol, mannitol, etc., condensates of alkylene oxides, such as ethylene oxide, propylene oxide, butylene oxide, isobutylene oxide, glycidyl epichlorohydrin, glycidyl ethers, etc., with polyhydric alcohols, such as the foregoing and with polyhydric thioethers, such as 2,2'-dihydroxy diethyl sulfide, 2,2',3,3'-tetrahydroxy dipropyl sulfide, etc. The hydroxy-aldehydes and ketones may be exemplified by dextrose, fructose, maltose, glyceraldehyde. The mercapto(thio) alcohols may be exemplified by alpha-monothioglycerol; alpha, alpha-dithioglycerol, etc. The polyhydric alcohol esters may be exemplified by monoglycerides, such as monostearin, monoesters of pentaerythritol and acetic acid, butyric acid, pentanoic acid, and the like. The halogenated polyhydric alcohols may be exemplified by the monochloride of pentaerythritol, monochloride of sorbitol, monochloride of mannitol, monochloride of glycerol, and the like.

The products obtained by the method shown in the preceding paragraph may be described as polyether polyepoxide reaction products which in general contain at least three non-cyclic ether

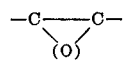

linkages, terminal epoxide-containing ether

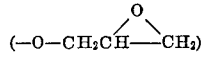

groups and halogen attached to a carbon of an intermediate

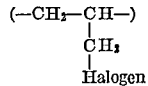

group.

Some of these epoxy resins are more difficult to disperse than others and some fibers are more difficult to wet; therefore, it has been found desirable to add a wetting agent to the epoxy composition to overcome these problems. Thus, where the epoxy resin composition is described as consisting essentially of a polyepoxide, it to be understood that a wetting agent may be present.

While the process of the present invention shows particular improvement in the bonding to rubber of polyester in the form of film, molded objects, monofilaments, fiber, yarn, cord or fabric, the process may be applied with equal facility to the bonding of rubber to other reinforcing elements made of regenerated cellulosic materials, polyamides both aliphatic and aromatic types, polyacrylonitrile, glass and similar materials difficult to adhere to rubber.

The following examples are set forth as representative of the process of this invention. All parts are by weight unless otherwise indicated.

EXAMPLE 1

A tire cord is made by first twisting 1100 denier yarn (also known as "singles") at the rate of 12 turns per inch, and then twisting two of these singles at the rate of 12 turns per inch to form a cord (also known as a "cable"). The yarn is made of polyester.

The polyepoxide is made by reacting 3 mols of glycerol with 9 mols of epichlorohydrin in the presence of 10 parts of diethyl ether solution, containing about 4.5% boron trifluoride at between 50° C. to 75° C. for about 3 hours. The resulting polyglycidyl ether has a molecular weight of about 324 and an epoxy value of 0.671 equivalent per 100 grams of polymer. The polyester filaments are made from the copolyester of ethylene terephthalate and ethylene isophthalate in accordance with the teaching of U.S. Patent 2,965,613.

A 10% solution of the polyglycidyl ether is made by heating the polyglycidyl ether in water. The polyester fiber is then passed through this 10% solution at the rate of 3 linear feet of cord per minute at room temperature and then passed into an oven heated at a temperature sufficient to vaporize at least a portion of the polyepoxide, which occurs when the heating is done at 350° F. for 3 minutes while maintaining the cord under a tension of 450 grams. The epoxy- and heat-treated cord is then passed through a dip tank containing an R/F/L adhesive composition containing the rubber latex and the resin latex as described in Example A. The cord is passed through this dip tank at the rate of 3 linear feet per minute and then into an oven heated at 350° F. for 3 minutes while the cord is held under a tension of 450 grams.

The polyester cord treated in accordance with the process of this invention is then molded for 15 minutes at 300° F. into an H-block specimen using the following recipe:

| | Parts (by weight) |
|---|---|
| Natural rubber | 100 |
| Zinz oxide | 3.00 |
| Carbon black | 29.80 |
| Stearic acid | 2.00 |
| Pine tar | 7.00 |
| Accelerator (Altax, i.e. benzothiazole disulfide) | 1.25 |
| Sulfur | 3.00 |
| Accelerator activator (diphenylguanidine) | 0.15 |
| Antioxidant A (a commercial non-standing antioxidant comprising a mixture of alkylated phenols or styrenated phenols) | 1.00 |

The specimen is then removed from the mold, and the adhesion of the cord to the rubber determined by measuring the pounds pull needed to separate the cord from the rubber. The polyester cord treated with the second dip tank adhesive alone used as a control has a hot static adhesion of 12.4 pounds. The polyester cord treated in accordance with the improved process of this invention as described above has a hot static adhesion pull of 21.2 pounds. Similar desirable adhesion is obtained when the polyester filaments used in making the cord of this example were made from polyethylene terephthalate polyester.

The effect of varying the temperature at which the first treatment of the cord with an epoxy resin is dried on the cord, and in which the second treatment with the adhesive composition is dried in each instance at 350° F. for 3 minutes, is shown in Examples 2 through 8 in Table 1, below:

Table 1

| Examples | Pounds Hot Static Adhesion (250° F.) | |
|---|---|---|
| | Epoxy Pre-Dip Drying Temp., °F. | R/F/L Second Dip Dried 3 Minutes @ 350° F. |
| 2 | 200 | 12.0 |
| 3 | 225 | 12.2 |
| 4 | 250 | 12.7 |
| 5 | 275 | 15.3 |
| 6 | 300 | 20.1 |
| 7 | 325 | 21.7 |
| 8 | 350 | 21.0 |

The effect of varying the temperature at which the second treatment of the cord with the adhesive composition is dried on top of the first treatment with an epoxy resin dried in each instance at 350° F. for 3 minutes is shown in Examples 9 through 15 in Table 2, below:

Table 2

| Examples | R/F/L Second Dip Drying Temperature, °F. | Epoxy Pre-Dip Dried 3 Minutes @ 350° F. |
|---|---|---|
| 9 | 200 | 14.4 |
| 10 | 225 | 15.1 |
| 11 | 250 | 14.7 |
| 12 | 275 | 15.8 |
| 13 | 300 | 17.9 |
| 14 | 325 | 20.0 |
| 15 | 350 | 19.7 |

The effect of heating the epoxy-treated fiber used in Example 1 at 350° F. for from 1 minute to 4 minutes, followed by heating the second treatment with the R/F/L dip used in Example 1 at 350° F. for 3 minutes in each instance, on hot static adhesion pull is shown in Examples 16 through 19, Table 3, below:

Table 3

| Examples | Time, Min. | Pounds Hot Static Adhesion @ 250° F. |
|---|---|---|
| 16 | 1 | 16 |
| 17 | 2 | 21.7 |
| 18 | 3 | 20.7 |
| 19 | 4 | 21.3 |

The effect of the percent solids in the R/F/L adhesive dip when applied to the epoxy heat-treated cord as described in Example 1 on the hot static adhesion is shown in Examples 20 through 25 in Table 4, below:

Table 4

| Examples | R/F/L Percent Solids | Pounds Static Adhesion @ 250° F. | |
|---|---|---|---|
| | | 2% Epoxy Pre-Dip | 4% Epoxy Pre-Dip |
| 20 | 3½ | 10.1 | 11.3 |
| 21 | 5 | 12.3 | 12.5 |
| 22 | 7½ | 16.4 | 18.4 |
| 23 | 10 | 19.8 | 21.5 |
| 24 | 15 | 20.5 | 20.0 |
| 25 | 20 | 21.4 | 21.6 |

The percent solids of epoxy resin in the first dip may range from about ½ to about 10, and preferably from about 1.5 to 3. The amount of epoxy resin solids deposited on the cord surface may range from about 0.1 to 2.0% by weight of the cord, and preferably about 0.5 to 1.0%.

Total solids of both rubber and resin present in the second dip may range from about 6% to about 30%, and preferably from about 8% to 20%, and generally about 15% to about 18%. The amount of R/F/L solids pickup on the surface of the epoxy heat-treated cord may range from about 1% to about 5% and preferably about 2%. When the adhesive composition used in the second treatment contains both a rubber latex and an aldehyde condensate, the condensate should make up preferably at least 5% by weight of the total solids of the composition, and more preferably from about 10% to about 50% of the total solids. The rubber latex is preferably employed from about 60% to 90% of the total solids. The rubber stock being reinforced may contain conventional additives, including antioxidants, loading agents, reinforcing agents, accelerators, vulcanizing agents, and the like, well-known and employed in the compounding of rubber stock.

The compounded rubber may be vulcanized in the presence of the reinforcing cord at temperatures ranging above 200° F., and preferably 250° to 350° F. for 5 to 60 minutes, depending upon the accelerators used for bringing about the desired vulcanization of the rubber.

Pneumatic tires made in a conventional manner with SBR rubber and reinforced with polyester cord bonded to the rubber by the process of this invention developed exceptional mileage without signs of ply separation or cord-to-rubber breakdown otherwise observed when using the prior art methods of adhering polyester cord to rubber.

While certain representative embodiments and details have been shown for the purpose of illustrating the invention, it will be apparent to those skilled in this art that various changes and modifications may be made therein without departing from the spirit or scope of the invention.

What is claimed is:

1. A process of treating a polyester reinforcing element to improve its ability to adhere to a rubbery composition which comprises applying to the reinforcing element a composition comprising a polyepoxide, heating the reinforcing element in the absence of a curing agent for the polyepoxide at a temperature above 275° F. and for a time sufficient to cause reaction of at least a portion of the polyepoxide with said element.

2. The process of claim 1 wherein the temperature at which the element is heat treated is below the softening temperature of the polyester element.

3. The process of claim 1 wherein the polyepoxide is a polyglycidyl ether.

4. The process of claim 1 wherein the heat treated element is further treated with an adhesive composition comprising essentially the reaction product of a polyhydric phenol, an aldehyde and a rubber latex, and then heating the adhesive-treated element within the first mentioned temperature range.

5. A process of treating a polyester fiber to improve its ability to adhere to a rubbery polymer which comprises treating the polyester fiber with a composition comprising a polyepoxide present in an amount ranging from about ½% to 10% based upon the weight of the fiber, and then heating the fiber in the absence of a curing agent for the polyepoxide at a temperature of from about 275° F. to about 350° F. and for a time sufficient to cause reaction of at least a portion of the polyepoxide with said fiber, applying to the heat treated fiber an adhesive composition consisting essentially of resorcinol, formaldehyde and a rubber latex at such a rate as to deposit on the fiber from about 1% to about 5% solids and then heating the fiber at a temperature of about 250° F. to about 350° F.

6. The process of claim 5 wherein the heat treated fiber is embedded in a rubbery composition and the assembly vulcanized at a temperature sufficient to cause adhesion of the polyester fiber to the rubbery composition.

References Cited by the Examiner

UNITED STATES PATENTS

| | | | |
|---|---|---|---|
| 2,902,398 | 9/1959 | Schroeder | 156—315 |
| 2,975,077 | 3/1961 | Coe | 117—161 |
| 3,036,948 | 5/1962 | Danielson | 156—330 |

EARL M. BERGERT, *Primary Examiner.*

CARL F. KRAFFT, *Examiner.*